United States Patent
Otonari et al.

(10) Patent No.: US 9,699,796 B2
(45) Date of Patent: Jul. 4, 2017

(54) BASE STATION DEVICE AND BAND CONTROL METHOD

(71) Applicant: FUJITSU LIMITED, Kawasaki-shi, Kanagawa (JP)

(72) Inventors: Junji Otonari, Kawasaki (JP); Dai Kimura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 73 days.

(21) Appl. No.: 14/685,652

(22) Filed: Apr. 14, 2015

(65) Prior Publication Data

US 2015/0365958 A1 Dec. 17, 2015

(30) Foreign Application Priority Data

Jun. 13, 2014 (JP) .................................. 2014-122816

(51) Int. Cl.
*H04L 1/00* (2006.01)
*H04W 72/08* (2009.01)
*H04W 24/08* (2009.01)
*H04W 72/04* (2009.01)
*H04W 88/08* (2009.01)

(52) U.S. Cl.
CPC ......... *H04W 72/085* (2013.01); *H04W 24/08* (2013.01); *H04W 72/0453* (2013.01); *H04W 72/082* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2010/0120446 | A1* | 5/2010 | Gaal | H04W 72/1231 455/452.2 |
| 2012/0263047 | A1* | 10/2012 | Love | H04W 72/00 370/252 |
| 2012/0282889 | A1* | 11/2012 | Tanaka | H04J 11/0053 455/405 |

FOREIGN PATENT DOCUMENTS

JP 2010-103753 5/2010

OTHER PUBLICATIONS

3GPP TR 36.921 v9.0.0 (Mar. 2010) Technical Specification Group Radio Access Network; Evolved Universal Terrestrial Radio Access (E-UTRA); FDD Home eNode B (HeNB) Radio Frequency (RF) requirements analysis (Release 9), pp. 1-45.

(Continued)

*Primary Examiner* — Kibrom T Hailu
(74) *Attorney, Agent, or Firm* — Fujitsu Patent Center

(57) ABSTRACT

A HeNB includes a CQI acquiring unit and an SIR acquiring unit that measure communication qualities of transmission bands on an uplink side and a downlink side. The HeNB, upon detecting an interference difference between bands in a transmission band on each of the uplink side and the downlink side on the basis of a result of measurement of the communication qualities, sets allocation of a band in which the communication quality satisfies a predetermined condition in the transmission band in which the interference difference is detected. The HeNB includes a control unit that, upon detecting signal interference on the downlink side on the basis of the result of the measurement of the communication qualities, controls a band on the downlink side, and controls a band on the uplink side in the transmission band in cooperation with the control on the band on the downlink side.

4 Claims, 16 Drawing Sheets

(56) References Cited

OTHER PUBLICATIONS

3GPP TR 36.922 v9.1.0 (Jun. 2010) Technical Specification Group Radio Access Network; Evolved Universal Terrestrial Radio Access (E-UTRA); TDD Home eNode B (HeNB) Radio Frequency (RF) requirements analysis (Release 9), pp.

* cited by examiner

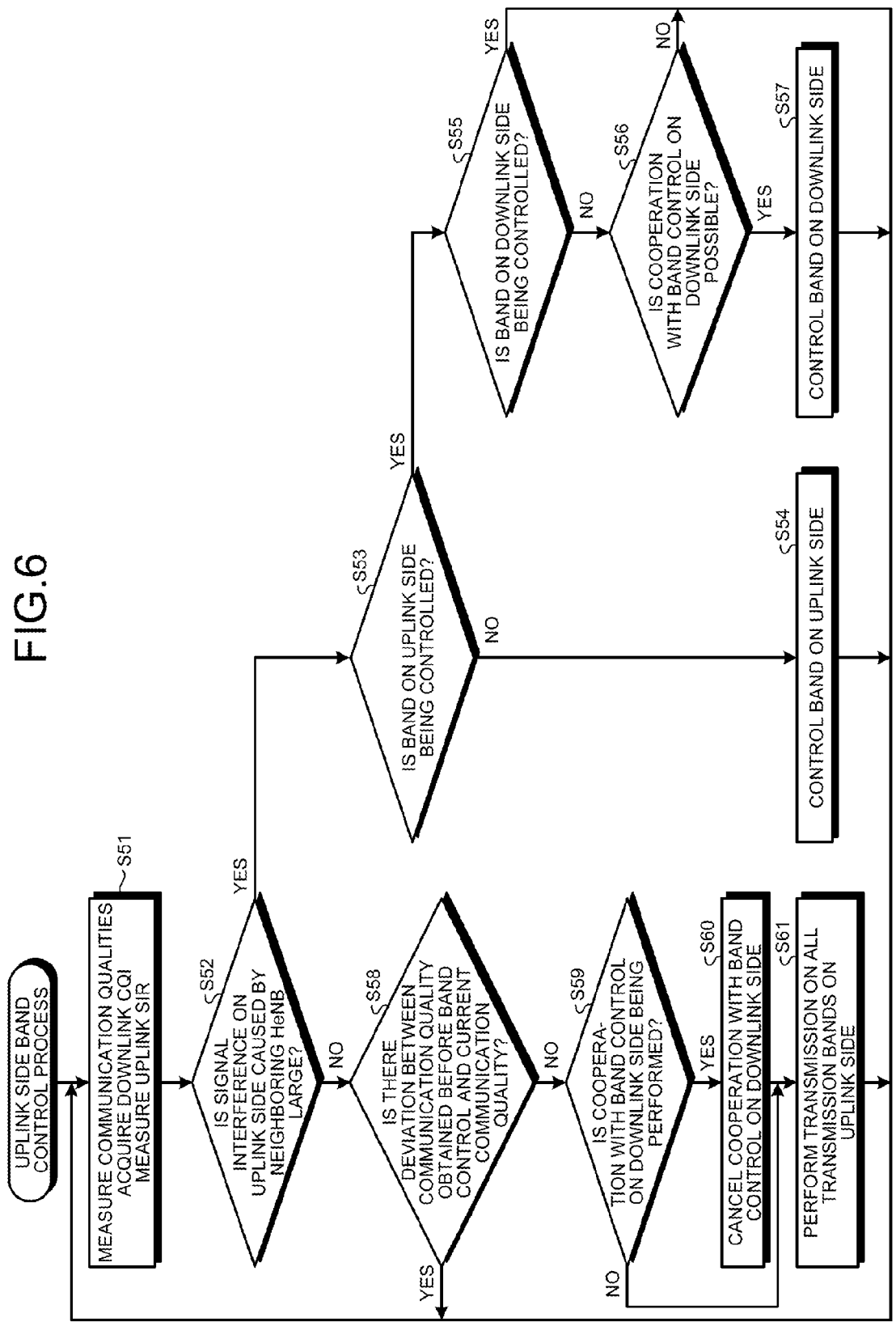

BASE STATION DEVICE AND BAND CONTROL METHOD

CROSS-REFERENCE TO RELATED APPLICATION

This application is based upon and claims the benefit of priority of the prior Japanese Patent Application No. 2014-122816, filed on Jun. 13, 2014, the entire contents of which are incorporated herein by reference.

FIELD

The embodiments discussed herein are related to a base station device and a band control method.

BACKGROUND

In recent years, regarding wireless systems, such as mobile phone networks, studies are in progress to install femto base stations (Home eNodeBs (HeNBs)), which form small wireless cells for wirelessly connecting communication terminal devices (User Equipments (UEs)), in ordinary residences, enterprises, and the like in order to improve the qualities of phone services in the installed areas or to enhance service areas.

FIG. 10 is an explanatory diagram illustrating an example of a situation in which signal interference occurs between neighboring HeNBs. A femto wireless system 100 illustrated in FIG. 10 includes a plurality of HeNBs 101 (101A and 101B) and a plurality of Home User Equipments (HUEs)) 102 (102A and 102B). Each of the HeNBs 101 uses the same communication frequency. The HUE 102A is wirelessly connected to the HeNB 101A, and the HUE 102B is wirelessly connected to the HeNB 101B. The HeNBs 101 are located close to each other; therefore, signal interference occurs between the neighboring HeNBs 101. Signal interference also occurs between each of the HeNBs 101 and each of the HUEs 102 that are wirelessly connected to the other neighboring HeNBs 101. Therefore, a communication speed may decrease or communication may be disconnected between the HeNB 101A and the HUE 102A and between the HeNB 101B and the HUE 102B.

As a countermeasure against the signal interference between the neighboring HeNBs 101, a band control process has been known that controls allocation of transmission bands such that the transmission bands to be used do not overlap between the neighboring HeNBs 101. FIGS. 11A to 11C are explanatory diagrams illustrating an example of processing operation performed by each of the HeNBs 101 in relation to the band control process.

The HeNB 101A illustrated in FIGS. 11A to 11C acquires, as illustrated in FIG. 11A, a communication quality, such as a Channel Quality Indicator (CQI) or a Signal Interference Power ratio (SIR), with respect to the wirelessly-connected HUE 102A. The CQI indicates a communication quality on a downlink side, and the SIR indicates a communication quality on an uplink side. Further, the HeNB 101B acquires a communication quality, such as a CQI or an SIR, with respect to the wirelessly-connected HUE 102B. For example, upon detecting degradation of the CQI of a currently-used transmission band on the downlink side on the basis of a CQI value, the HeNB 101A detects signal interference on the downlink side.

The HeNB 101A, upon detecting the signal interference on the downlink side, controls the currently-used band on the downlink side as illustrated in FIG. 11B. The HeNB 101A divides the transmission band on the downlink side into a high band and a low band, turns OFF the transmission power of the transmission band on the high band side, and turns ON the transmission power of the transmission band on the low band side. Consequently, the neighboring HeNB 101B recognizes that the CQI of a transmission band on the low band side is still degraded but the CQI of a transmission band on the high band side is improved in a currently-used transmission band.

The HeNB 101B detects, as an interference difference, a large difference between the CQI of the transmission band on the high band side and the CQI of the transmission band on the low band side in the currently-used transmission band. The HeNB 101B, upon detecting the interference difference in the CQI, recognizes that the neighboring HeNB 101A side has controlled the band. Upon recognizing that the neighboring HeNB 101A side has controlled the band, the HeNB 101B controls the currently-used band on the downlink side as illustrated in FIG. 11C. The HeNB 101B divides the currently-used transmission band on the downlink side, turns ON the transmission power of the transmission band on the high band side in which the CQI is degraded, and turns OFF the transmission power of the transmission band on the low band side in which the CQI is at a high level.

Namely, the HeNB 101A turns OFF the transmission power of the transmission band on the high band side and turns ON the transmission power of the transmission band on the low band side, and the HeNB 101B turns OFF the transmission power of the transmission band on the low band side and turns ON the transmission power of the transmission band on the high band side. Consequently, the transmission bands used by the neighboring HeNBs 101 do not overlap each other, so that it becomes possible to avoid signal interference on the downlink side.

As described above, the HeNB 101, even without a means for notifying the neighboring HeNB 101 of the transmission band to be used, recognizes that the neighboring HeNB 101 has controlled the band on the basis of the communication quality of each of the transmission bands, and autonomously controls the band for the currently-used link. Consequently, it is possible to avoid signal interference on the uplink side or the downlink side.

Patent Literature 1: Japanese Laid-open Patent Publication No. 2010-103753

Non Patent Literature 1: 3GPP TS36.921 v9.0.0

Non Patent Literature 2: 3GPP TS36.922 v9.1.0

For example, when the HUE 102A approaches the neighboring HeNB 101B and the HUE 102A is subjected to signal interference on the downlink side by the HeNB 101B, each of the HeNBs 101 controls a band on the downlink side. FIG. 12 is an explanatory diagram illustrating an example of a situation in which the HUE 102A is subjected to the signal interference on the downlink side by the neighboring HeNB 101B. FIGS. 13A to 13C are explanatory diagrams illustrating an example of operation performed by each of the HeNBs 101 for controlling the band on the downlink side in the situation illustrated in FIG. 12. It is assumed that the HUE 102A is wirelessly connected to the HeNB 101A.

As illustrated in FIG. 13A, the HeNB 101A acquires a CQI report from the HUE 102A, detects degradation of a CQI of a currently-used transmission band on the downlink side on the basis of the CQI, and detects signal interference on the downlink side on the basis of a result of the detection. In contrast, the HeNB 101B acquires a CQI report from the HUE 102B, and because a CQI of a currently-used transmission band on the downlink side is at a high level, recognizes a state in which signal interference on the downlink side is less likely to occur on the basis of the CQI.

The HeNB 101A, upon detecting the signal interference on the downlink side, controls the currently-used band on the downlink side as illustrated in FIG. 13B. The HeNB 101A divides the currently-used transmission band on the downlink side into a high band and a low band, turns OFF the transmission power of the transmission band on the high band side, and turns ON the transmission power of the transmission band on the low band side. However, because an interference difference between the CQI of the transmission band on the high band side and the CQI of the transmission band on the low band side in the currently-used transmission band on the downlink side is minute, the HeNB 101B is unable to recognize that the neighboring HeNB 101A side has divided the transmission band, that is, the neighboring HeNB 101A side has controlled the band.

Accordingly, as illustrated in FIG. 13C, because the neighboring HeNB 101B side does not control the band on the downlink side and therefore the HeNB 101A is unable to recognize that the band on the downlink side is controlled, the HeNB 101A continuously detects degradation of the CQI of the transmission band on the downlink side. Consequently, the HeNB 101A remains in the state in which it is difficult to avoid signal interference on the downlink side.

Further, for example, when the HUE 102A approaches the neighboring HeNB 101B and the HeNB 101B is subjected to signal interference on the uplink side by the HUE 102A, each of the HeNBs 101 controls a band on the uplink side. FIG. 14 is an explanatory diagram illustrating an example of a situation in which the neighboring HeNB 101B is subjected to signal interference on the uplink side by the HUE 102A that is the other one of the HUEs 102. FIGS. 15A to 15C are explanatory diagrams illustrating an example of operation performed by each of the HeNBs 101 for controlling the band on the uplink side in the situation illustrated in FIG. 14. It is assumed that the HUE 102A is wirelessly connected to the HeNB 101A.

As illustrated in FIG. 15A, the HeNB 101B measures an SIR of the transmission band on the uplink side, detects degradation of the SIR of the currently-used transmission band on the uplink side on the basis of the SIR, and detects signal interference on the uplink side on the basis of a result of the detection. In contrast, the HeNB 101A measures an SIR of the transmission band on the uplink side, and because the SIR of the currently-used transmission band on the uplink side is at a high level, recognizes a state in which signal interference on the uplink side is less likely to occur on the basis of the SIR.

The HeNB 101B, upon detecting the signal interference on the uplink side, controls the band on the uplink side as illustrated in FIG. 15B. The HeNB 101B divides, for the HUE 102B, the currently-used transmission band on the uplink side into a high band and a low band, turns OFF the transmission power of the transmission band on the low band side, and turns ON the transmission power of the transmission band on the high band side. However, because an interference difference between the SIR of the transmission band on the low band side and the SIR of the transmission band on the high band side in the currently-used transmission band is minute, the HeNB 101A is unable to recognize that the neighboring HeNB 101B side has divided the transmission band, that is, the neighboring HeNB 101B side has controlled the band.

Accordingly, as illustrated in FIG. 15C, because the neighboring HeNB 101A side does not control the band on the uplink side and therefore the HeNB 101B is unable to recognize that the band on the uplink side is controlled, the HeNB 101B continuously detects degradation of the SIR of the transmission band on the uplink side. Consequently, the HeNB 101B remains in the state in which it is difficult to avoid signal interference on the uplink side.

Namely, in a situation in which the HeNB 101A, as one of the neighboring HeNBs 101, is not influenced by the signal interference, the HeNB 101A is unable to recognize that the HeNB 101B side, as the other one of the neighboring HeNBs 101, controls a band. Therefore, it is difficult to control the bands between the neighboring HeNBs 101, making it difficult to avoid the signal interference between the neighboring HeNBs 101.

SUMMARY

According to an aspect of the embodiments, a base station device includes a measuring unit, a first control unit and a second control unit. The measuring unit measures a communication quality of a transmission band on each of an uplink side and a downlink side. The first control unit, upon detecting a difference in the communication quality in the transmission band on each of the uplink side and the downlink side on the basis of a result of measurement by the measuring unit, allocates a band, in which the communication quality satisfies a predetermined condition, to communication in the transmission band in which the difference in the communication quality is detected. The second control unit, upon detecting signal interference in one of the uplink side and the downlink side on the basis of the result of the measurement by the measuring unit, controls communication allocation for a transmission band on the one link side in which the signal interference is detected, and controls communication allocation for a transmission band on other one of the uplink side and the downlink side corresponding to the one link side in the transmission band, in cooperation with control of the communication allocation for the transmission band on the one link side.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a flowchart illustrating an example of processing operation performed by the scheduler unit in the HeNB in relation to an uplink band control process;

DESCRIPTION OF EMBODIMENTS

Preferred embodiments of the present invention will be explained with reference to accompanying drawings. The disclosed technology is not limited to the embodiments. The embodiments described below may be combined appropriately as long as no contradiction is derived.

[a] First Embodiment

Figure 1:
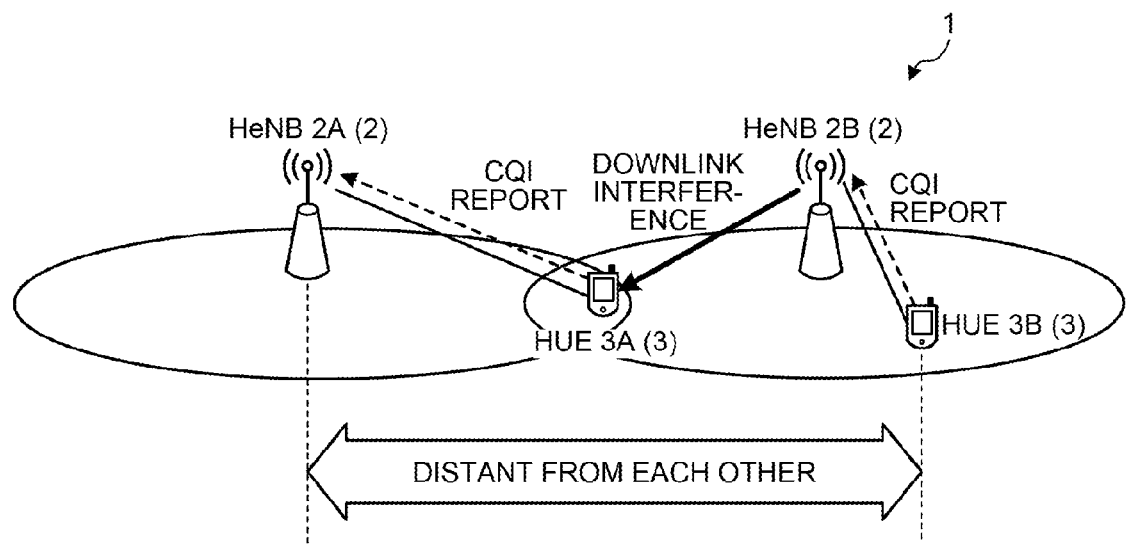
FIG. 1 is an explanatory diagram illustrating an example of a femto wireless system according to a first embodiment.

FIG. 1 is an explanatory diagram illustrating an example of a femto wireless system according to a first embodiment. A femto wireless system 1 illustrated in FIG. 1 includes HeNBs 2 (2A and 2B) as a plurality of base station devices, and a plurality of HUEs 3 (3A and 3B). The HeNB 2A is wirelessly connected to the HUE 3A, and the HeNB 2B is wirelessly connected to the HUE 3B. The HeNBs 2A and 2B perform wireless communication by using transmission bands that are the same frequency band. In the wireless communication between the HeNB 2 and the HUE 3, for example, Frequency Division Duplex (FDD) for uplink/downlink communication specified by Long Term Evolution (LTE) based on Third Generation Partnership Project (3GPP) standard is employed.

Figure 2:
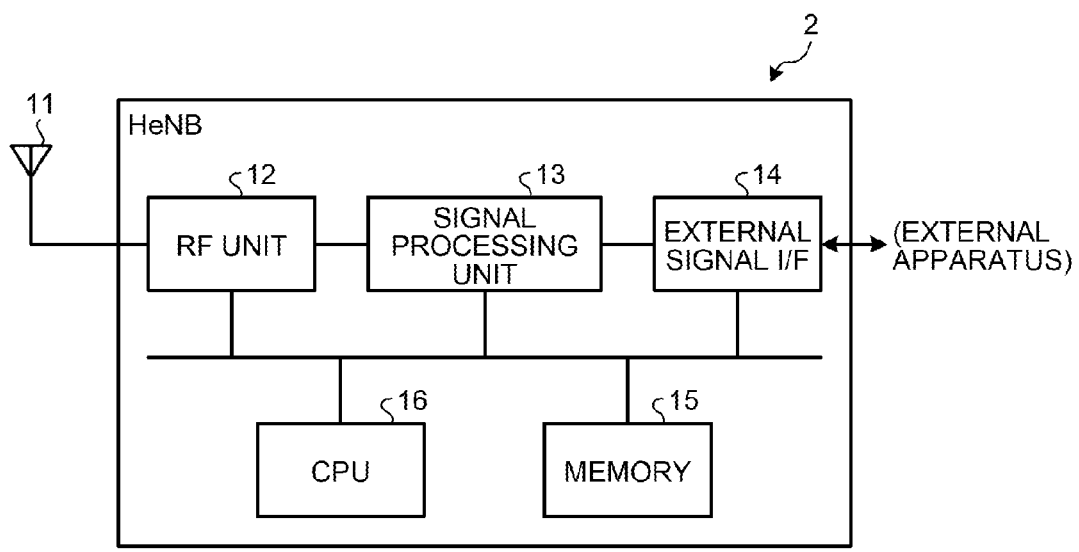
FIG. 2 is a block diagram illustrating an example of the inside of a HeNB.

FIG. 2 is a block diagram illustrating an example of the inside of the HeNB 2. The HeNB 2 illustrated in FIG. 2 includes an antenna 11, a Radio Frequency (RF) unit 12, a signal processing unit 13, an external signal Interface (I/F) 14, a memory 15, and a Central Processing Unit (CPU) 16. The antenna 11 transmits and receives wireless signals to and from the wirelessly-connected HUE 3. The RF unit 12 is a section that converts wireless signals into electrical signals. The signal processing unit 13 performs various signal processing, such as a termination process or a communication protocol conversion process, on electrical signals. The external signal I/F 14 is an interface for transmitting and receiving signals to and from external network devices (not illustrated). The memory 15 corresponds to a Random Access Memory (RAM), such as a Synchronous Dynamic Random Access Memory (SDRAM), or corresponds to a Read Only Memory (ROM), a flash memory, or the like, and serves as an area for storing information and the like needed for various programs and various processes. The CPU 16 is a processor that manages or controls the entire processing operation of the HeNB 2.

Figure 3:
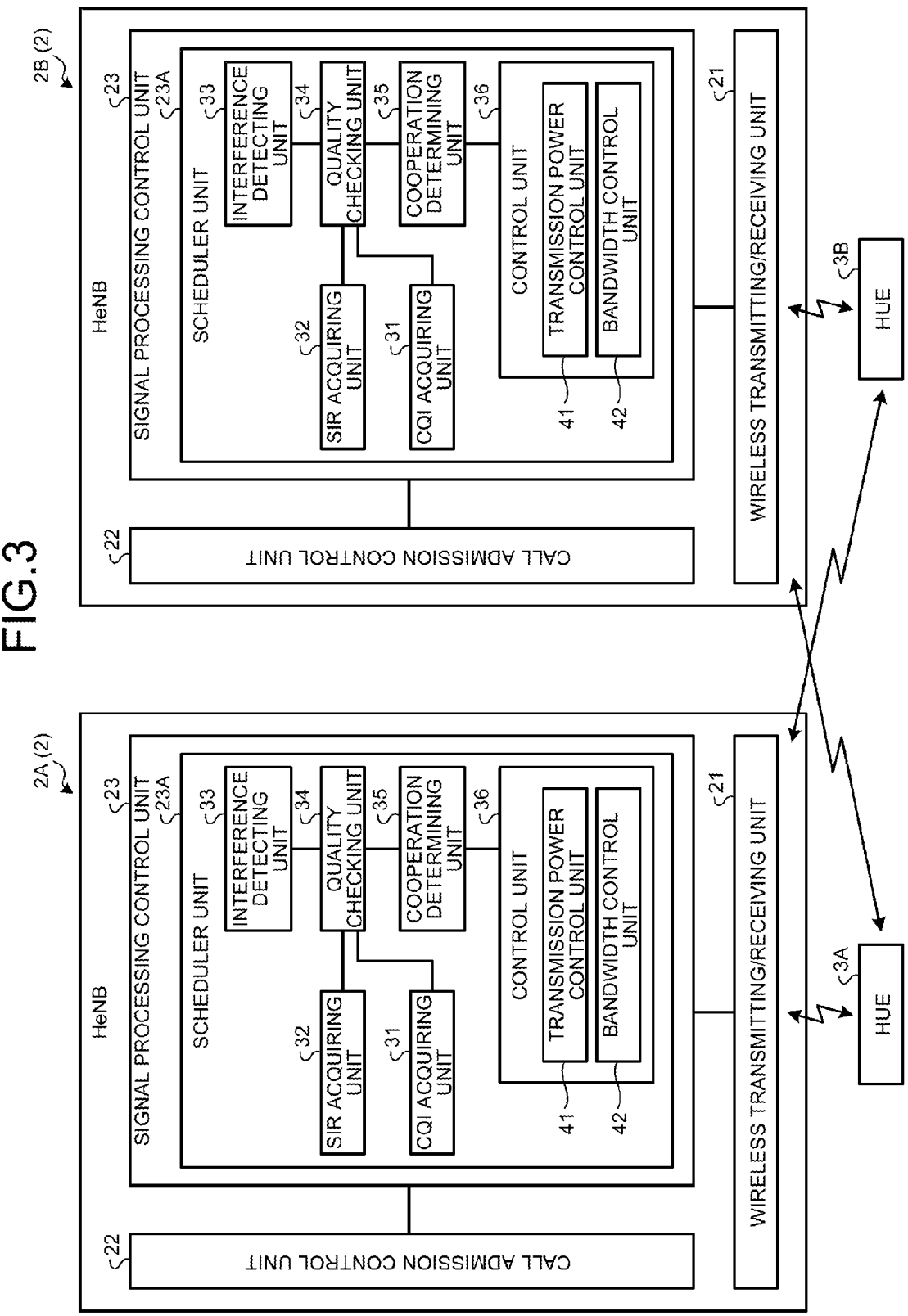
FIG. 3 is a block diagram illustrating an example of a functional configuration in the HeNB.

FIG. 3 is a block diagram illustrating an example of a functional configuration in the HeNB 2. A configuration of the HeNB 2A will be described below for convenience of explanation. However, the HeNB 2B has the same configuration, and therefore, the same configurations and operation will be denoted by the same symbols and explanation thereof will be omitted.

The HeNB 2A includes a wireless transmitting/receiving unit 21, a call admission control unit 22, and a signal processing control unit 23. The wireless transmitting/receiving unit 21 is a communication function to transmit and receive wireless signals in the RF unit 12. The call admission control unit 22 performs a termination process or the like on a Radio Resource Control (RRC) message when performing wireless communication with the HUE 3. The RRC message is, for example, a message indicating a resource status of the femto wireless system 1.

The signal processing control unit 23 is a control function to control various signal processes, such as a baseband signal process, in the signal processing unit 13. The signal processing control unit 23 includes a scheduler unit 23A that performs a scheduling process on a plurality of the HUEs 3 wirelessly connected to the HeNB 2. For example, the scheduler unit 23A selects a resource allocation in a time-axis direction and a frequency-axis direction when the HUEs 3 share a channel resource as in the LTE system.

The scheduler unit 23A includes a CQI acquiring unit 31, an SIR acquiring unit 32, an interference detecting unit 33, a quality checking unit 34, a cooperation determining unit 35, and a control unit 36. The CQI acquiring unit 31 is, for example, a measuring unit that collects reports on a CQI indicating a communication quality on the downlink side from the wirelessly connected HUE 3, and acquires the CQI. The SIR acquiring unit 32 is, for example, a measuring unit that acquires an SIR indicating a communication quality on the uplink side with respect to the wirelessly-connected HUE 3. The interference detecting unit 33 detects signal interference on the uplink side and signal interference on the downlink side on the basis of the CQI and the SIR. The interference detecting unit 33 detects signal interference on the uplink side and signal interference on the downlink side on the basis of the amount of interference indicating a level of the measured signal interference.

The quality checking unit 34 collects the CQI from the CQI acquiring unit 31, and collects the SIR from the SIR acquiring unit 32. The quality checking unit 34 checks the communication quality on the downlink side on the basis of the collected CQI, and checks the communication quality on the uplink side on the basis of the collected SIR. The cooperation determining unit 35 determines whether it is possible to control bands on the uplink side and the downlink side in a cooperative manner.

The control unit 36 includes a transmission power control unit 41 that controls transmission power of a transmission band on the uplink side or the downlink side, and a bandwidth control unit 42 that controls a bandwidth of the transmission band on the uplink side or the downlink side. The control unit 36 corresponds to a first control unit and a second control unit, for example. The transmission power control unit 41 adjusts the amount of transmission power of a transmission band. The bandwidth control unit 42 adjusts a bandwidth of a transmission band, and divides the transmission band for allocation to communication into a high band and a low band, for example. In the case of controlling a band on the uplink side, the control unit 36 instructs the HUE 3 wirelessly connected to the HeNB 2 to control the band on the uplink side.

The control unit 36, in the case of controlling a band, divides the transmission band into a high band and a low band through the bandwidth control unit 42. After dividing the transmission band into the high band and the low band, the control unit 36 turns OFF the transmission power of the transmission band on the high band side and turns ON the transmission power of the transmission band on the low band side through the transmission power control unit 41, for example. Further, the control unit 36 is able to adjust the amount of transmission power through the transmission power control unit 41 in addition to ON/OFF of the transmission power of the transmission band.

The control unit 36, upon detecting signal interference on the downlink side, controls a band on the downlink side to avoid the signal interference on the downlink side. When it is still difficult to avoid the signal interference on the downlink side after controlling the band on the downlink side, the control unit 36 controls a band on the uplink side corresponding to the downlink. The transmission band on the uplink side and the transmission band on the downlink side are neighboring bands at different frequencies. At this time, when the control unit 36 turns OFF the transmission band on the high band side and turns ON the transmission band on the low band side when controlling the band on the downlink side, the control unit 36 turns OFF the transmission band on the high band side and turns ON the transmission band on the low band side even when controlling the band on the uplink side. Namely, the control unit 36 matches band allocations between the transmission band on the uplink side and the transmission band on the downlink side. Then, the control unit 36 controls the band on the uplink side, in addition to controlling the band on the downlink side, in a cooperative manner.

The control unit 36, upon detecting signal interference on the uplink side, controls a band on the uplink side to avoid the signal interference on the uplink side. When it is still difficult to avoid the signal interference on the uplink side after controlling the band on the uplink side, the control unit 36 controls a band on the downlink side corresponding to the uplink. At this time, when the control unit 36 turns ON the transmission band on the high band side and turns OFF the transmission band on the low band side when controlling the band on the uplink side, the control unit 36 turns ON the transmission band on the high band side and turns OFF the transmission band on the low band side on the downlink side even when controlling the band on the downlink side. Namely, the control unit 36 matches band allocations between the transmission band on the uplink side and the transmission band on the downlink side. Then, the control unit 36 controls the band on the downlink side, in addition to controlling the band on the uplink side, in a cooperative manner.

The cooperation determining unit 35 performs a cooperation availability determination process of determining whether cooperation in band control on the uplink side and the downlink side is possible. For example, the cooperation determining unit 35 determines whether a transmission pattern as transmission data is present on the uplink side corresponding to the downlink, and when the transmission pattern is present, determines that cooperation in the band control is possible. Accordingly, the control unit 36 controls a band on the uplink side and a band on the downlink side in a cooperative manner. When the transmission pattern is absent on the uplink side, the cooperation determining unit 35 determines that cooperation in the band control is impossible.

Figure 4:
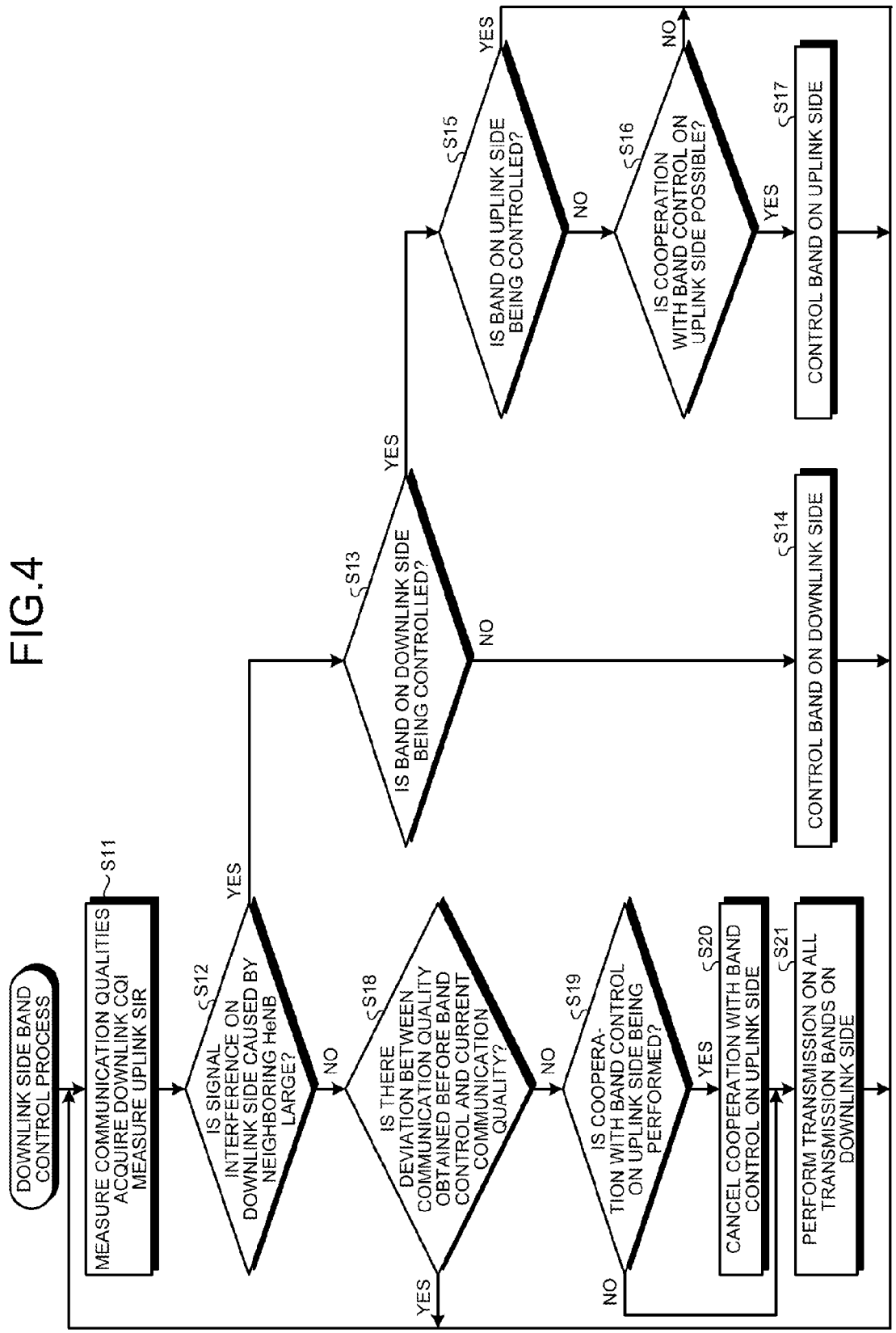
FIG. 4 is a flowchart illustrating an example of processing operation performed by a scheduler unit in the HeNB in relation to a downlink band control process.

Operation performed by the femto wireless system 1 of the first embodiment will be described below. FIG. 4 is a flowchart illustrating an example of processing operation performed by the scheduler unit 23A in the HeNB 2 in relation to a downlink band control process. The downlink band control process illustrated in FIG. 4 is a process of controlling a band on the uplink side while controlling a band on the downlink side in a cooperative manner when signal interference on the downlink side is detected.

In FIG. 4, the scheduler unit 23A acquires a communication quality on the uplink side and a communication quality on the downlink side (Step S11). Specifically, the CQI acquiring unit 31 acquires a CQI indicating the communication quality on the downlink side on the basis of a CQI report from the wirelessly-connected HUE 3. Further, the SIR acquiring unit 32 acquires an SIR indicating the communication quality on the uplink side.

The interference detecting unit 33 in the scheduler unit 23A determines whether signal interference on the downlink side with respect to the neighboring HeNB 2 is large on the basis of the CQI acquired by the CQI acquiring unit 31 (Step S12). Specifically, the process of determining whether the signal interference is large is a process of determining whether the influence of the signal interference on communication exceeds an acceptable threshold, and determining that the signal interference is large when the influence exceeds the acceptable threshold. When the signal interference on the downlink side is large (YES at Step S12), the control unit 36 in the scheduler unit 23A determines whether a band on the downlink side is being controlled (Step S13).

When the band on the downlink side is not being controlled (NO at Step S13), the control unit 36 starts to control the band on the downlink side (Step S14), and proceeds to Step S11 in order to measure a communication quality. Specifically, the control unit 36 divides the transmission band on the downlink side into a high band and a low band, and controls the band on the downlink side to turn OFF the transmission power of the transmission band on the high band side and turn ON the transmission power of the transmission band on the low band side, for example.

When the band on the downlink side is being controlled (YES at Step S13), the control unit 36 determines whether a band on the uplink side is being controlled (Step S15). When the band on the uplink side is not being controlled (NO at Step S15), the cooperation determining unit 35 determines whether cooperation with band control on the uplink side is possible on the basis of a result of the cooperation availability determination process to be described later (Step S16).

When the cooperation with the band control on the uplink side is possible (YES at Step S16), the cooperation determining unit 35 starts to control the band on the uplink side (Step S17), and proceeds to Step S11 in order to measure a communication quality. Specifically, the control unit 36 divides the transmission band on the uplink side into a high band and a low band. Further, the control unit 36 controls the band on the uplink side to turn OFF the transmission power of the transmission band on the high band side and turn ON the transmission power of the transmission band on the low band side on the uplink side, so as to match the band allocation in the band control on the downlink side.

When the band on the uplink side is being controlled (YES at Step S15), the control unit 36 proceeds to Step S11 in order to measure a communication quality. When the cooperation with the band control on the uplink side is not possible (NO at Step S16), the cooperation determining unit 35 proceeds to Step S11 in order to measure a communication quality.

When the signal interference on the downlink side is not large (NO at Step S12), the quality checking unit 34 determines whether there is a deviation between a communication quality obtained before the band control and a current communication quality (Step S18). When there is a deviation between the communication quality obtained before the band control and the current communication quality (YES at Step S18), the cooperation determining unit 35 proceeds to Step S11 in order to measure a communication quality while continuing the currently-performing band control. The currently-performing band control is the control of the band on the downlink side or the control of the bands on the downlink side and the uplink side.

When there is no deviation between the communication quality obtained before the band control and the current communication quality (NO at Step S18), the cooperation determining unit 35 determines that the signal interference on the downlink side is reduced for some reasons. Then, the cooperation determining unit 35 determines whether cooperation with the band control on the uplink side is being performed (Step S19). When the cooperation with the band control on the uplink side is being performed (YES at Step S19), the control unit 36 cancels the cooperation with the band control on the uplink side (Step S20). Then, the control unit 36 turns ON the transmission power of all of the transmission bands before the band on the downlink side is controlled (before the band is divided) (Step S21), and proceeds to Step S11 in order to measure a communication quality. When the cooperation with the band control on the uplink side is not being performed (NO at Step S19), the control unit 36 proceeds to Step S21 in order to turn ON the transmission power of all of the transmission bands on the downlink side.

The HeNB 2A that performs the downlink band control process, upon detecting signal interference on the downlink side, controls a band on the downlink side, and causes the neighboring HeNB 2B side to recognize that the HeNB 2A side controls the band. Therefore, the neighboring HeNB 2B is also able to avoid the signal interference on the downlink side between the neighboring HeNBs 2 by controlling the band on the downlink side.

Upon continuously detecting the signal interference on the downlink side after controlling the band on the downlink side, the HeNB 2A controls the band on the uplink side in cooperation with the control of the band on the downlink side, in order to enable the neighboring HeNB 2B side to easily recognize that the HeNB 2A side controls the bands. Further, the neighboring HeNB 2B is also able to avoid the signal interference on the downlink side between the neighboring HeNBs 2 by controlling the band on the uplink side and controlling the band on the downlink side in a cooperative manner.

FIGS. 5A to 5F are explanatory diagrams illustrating operation performed by each of the HeNBs 2 in relation to the downlink band control process. The HeNB 2A illustrated in FIG. 5A acquires a CQI report from the HUE 3A, detects degradation of a CQI of a currently-used transmission band on the downlink side on the basis of the CQI, and detects signal interference on the downlink side on the basis of a result of the detection. In contrast, the HeNB 2B acquires a CQI report from the HUE 3B, and because a CQI of a currently-used transmission band on the downlink side is at a high level, recognizes a state in which signal interference on the downlink side is less likely to occur on the basis of the CQI.

Figure 5A:
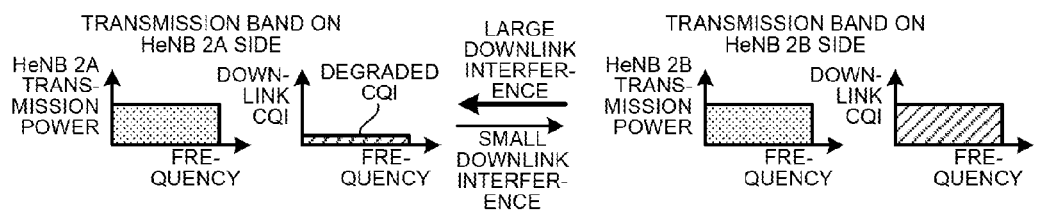
FIGS. 5A to 5F are explanatory diagrams illustrating operation performed by each of the HeNBs in relation to the downlink band control process.
Figure 5B:
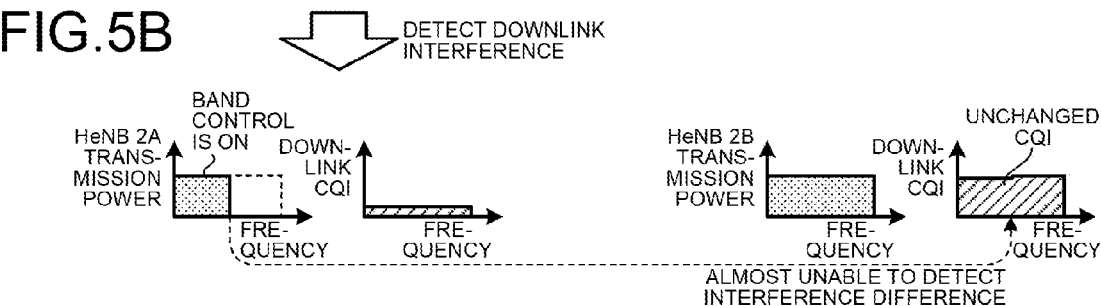

The HeNB 2A, upon detecting the signal interference on the downlink side, as illustrated in FIG. 5B, divides the currently-used transmission band into a high band and a low band, and controls the band on the downlink side to turn OFF the transmission power of the transmission band on the high band side and turn ON the transmission power of the transmission band on the low band side. However, because an interference difference between the CQI of the transmission band on the high band side and the CQI of the transmission band on the low band side in the currently-used transmission band is minute, the HeNB 2B is unable to recognize that the neighboring HeNB 2A side has divided the transmission band, that is, the neighboring HeNB 2A side has controlled the band on the downlink side.

Figure 5C:
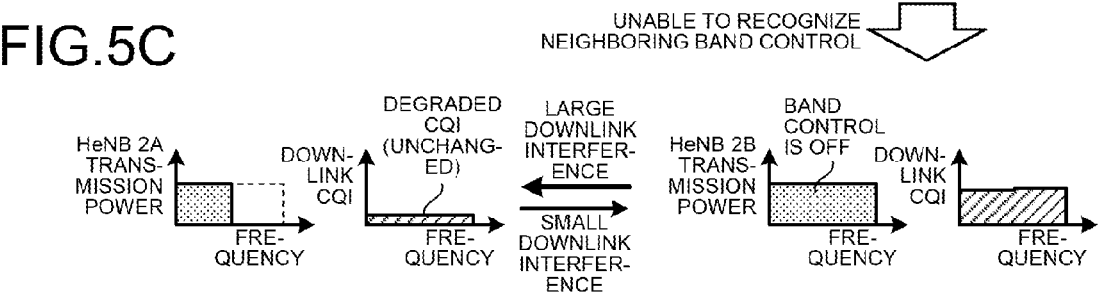
Figure 5D:
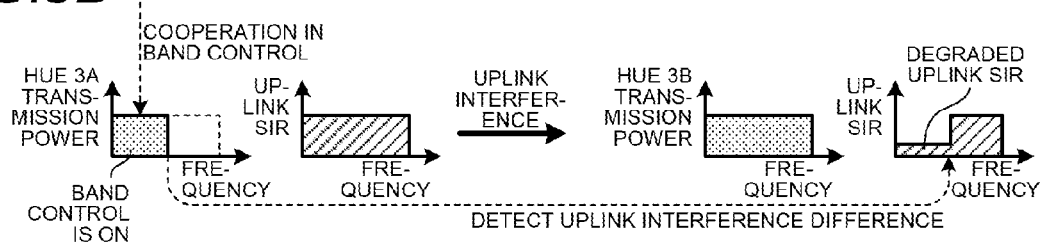

As illustrated in FIG. 5C, the HeNB 2A continuously detects the signal interference on the downlink side after controlling the band on the downlink side. Upon continuously detecting the signal interference on the downlink side, as illustrated in FIG. 5D, the HeNB 2A controls the band on the uplink side in cooperation with the band control on the downlink side. The HeNB 2A divides the transmission band on the uplink side into a high band and a low band, and controls the band on the uplink side to turn OFF the transmission power of the transmission band on the high band side and turn ON the transmission power of the transmission band on the low band side.

Figure 5E:
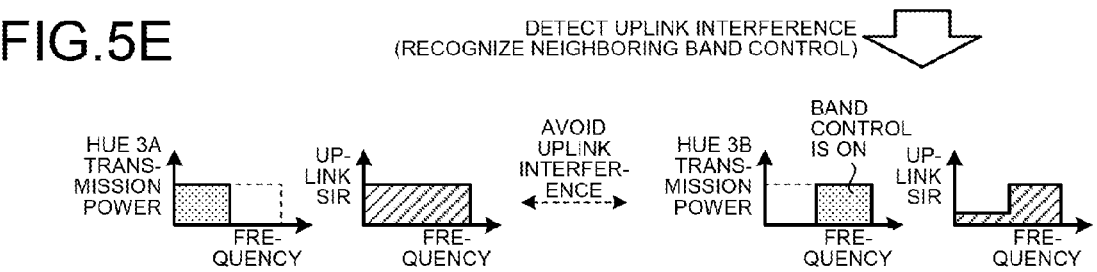

As illustrated in FIG. 5D, the HeNB 2B detects, as an interference difference, a large difference between an SIR of the transmission band on the high band side and an SIR of the transmission band on the low band side in a currently-used transmission band on the uplink side. The HeNB 2B, upon detecting the interference difference in the SIR, recognizes that the neighboring HeNB 2A side has controlled the band on the uplink side. Then, upon recognizing that the neighboring HeNB 2A side has controlled the band on the uplink side, the HeNB 2B controls the currently-used band on the uplink side as illustrated in FIG. 5E. The HeNB 2B divides the transmission band on the uplink side. The HeNB 2B controls the band on the uplink side to turn OFF the transmission power of the transmission band on the low band side in which the SIR is degraded, and turn ON the transmission power of the transmission band on the high band side in which the SIR is at a high level in the currently-used transmission band on the uplink side.

Figure 5F:
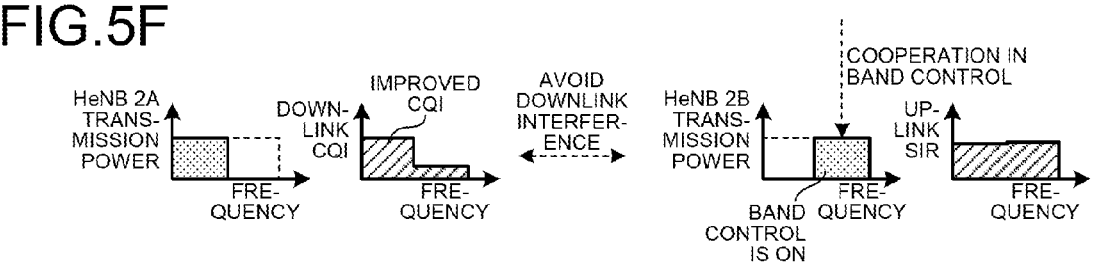

Further, the HeNB 2B controls the band on the downlink side as illustrated in FIG. 5F. The HeNB 2B divides the transmission band on the downlink side, turns OFF the transmission power of the transmission band on the low band side, and turns ON the transmission power of the transmission band on the high band side in the transmission band on the downlink side, in cooperation with the control of the transmission band on the uplink side. Consequently, the HeNB 2A recognizes that the neighboring HeNB 2B side has controlled the band on the downlink side, on the basis of an interference difference between the CQI on the low band side and the CQI of the high band side on the downlink side. Accordingly, the HeNB 2A is able to avoid signal interference on the downlink side in a state in which the transmission power of the transmission band on the high band side is turned OFF and the transmission power of the transmission band on the low band side is turned ON on the downlink side.

Namely, the HeNB 2A turns OFF the transmission power of the transmission band on the high band side for the uplink and the downlink, and turns ON the transmission power of the transmission band on the low band side for the uplink and the downlink. The HeNB 2B turns OFF the transmission power of the transmission band on the low band side for the uplink and the downlink, and turns ON the transmission power of the transmission band on the high band side for the uplink and the downlink. Therefore, the uplink and downlink transmission bands used by the neighboring HeNBs 2 do not overlap each other, so that it becomes possible to avoid not only signal interference on the downlink side but also signal interference on the uplink side.

FIG. 6 is a flowchart illustrating an example of processing operation performed by the scheduler unit 23A in the HeNB 2 in relation to an uplink band control process. The uplink band control process illustrated in FIG. 6 is a process of controlling a band on the downlink side while controlling a band on the uplink side in a cooperative manner when signal interference on the uplink side is detected.

In FIG. 6, the scheduler unit 23A acquires a communication quality on the uplink side and a communication quality on the downlink side (Step S51). The interference detecting unit 33 determines whether signal interference on the uplink side with respect to the neighboring HeNB 2 is large on the basis of the SIR acquired by the SIR acquiring unit 32 (Step S52). When the signal interference on the uplink side is large (YES at Step S52), the control unit 36 determines whether a band on the uplink side is being controlled (Step S53).

When the band on the uplink side is not being controlled (NO at Step S53), the control unit 36 starts to control the band on the uplink side (Step S54), and proceeds to Step S51 in order to measure a communication quality. Specifically, the control unit 36 divides the transmission band on the uplink side into a high band and a low band, and controls the band on the uplink side to turn ON the transmission power of the transmission band on the high band side and turn OFF the transmission power of the transmission band on the low band side, for example.

When the band on the uplink side is being controlled (YES at Step S53), the control unit 36 determines whether a band on the downlink side is being controlled (Step S55). When the band on the downlink side is not being controlled (NO at Step S55), the cooperation determining unit 35 determines whether cooperation with band control on the downlink side is possible on the basis of a result of the cooperation availability determination process (Step S56).

When the cooperation with the band control on the downlink side is possible (YES at Step S56), the cooperation determining unit 35 starts to control the band on the downlink side (Step S57), and proceeds to Step S51 in order to measure a communication quality. Specifically, the control unit 36 divides the transmission band on the downlink side into a high band and a low band. The control unit 36 controls the band on the downlink side to turn ON the transmission power of the transmission band on the high band side and turn OFF the transmission power of the transmission band on the low band side on the downlink side, so as to match the band allocation in the band control on the uplink side.

When the band on the downlink side is being controlled (YES at Step S55), the control unit 36 proceeds to Step S51 in order to measure a communication quality. When the cooperation with the band control on the downlink side is not possible (NO at Step S56), the cooperation determining unit 35 proceeds to Step S51 in order to measure a communication quality.

When the signal interference on the uplink side is not large (NO at Step S52), the quality checking unit 34 determines whether there is a deviation between a communication quality obtained before the band control and a current communication quality (Step S58). When there is a deviation between the communication quality obtained before the band control and the current communication quality (YES at Step S58), the cooperation determining unit 35 proceeds to Step S51 in order to measure a communication quality while continuing the currently-performing band control. The currently-performing band control is the control of the band on the uplink side or the control of the bands on the uplink side and the downlink side.

When there is no deviation between the communication quality obtained before the band control and the current communication quality (NO at Step S58), the cooperation determining unit 35 determines that the signal interference on the uplink side is reduced for some reason. Then, the cooperation determining unit 35 determines whether cooperation with the band control on the downlink side is being performed (Step S59). When the cooperation with the band control on the downlink side is being performed (YES at Step S59), the control unit 36 cancels the cooperation with the band control on the downlink side (Step S60). The control unit 36 turns ON the transmission power of all of the transmission bands before the band on the uplink side is controlled (before the band is divided) (Step S61), and proceeds to Step S51 in order to measure a communication quality. When the cooperation with the band control on the downlink side is not being performed (NO at Step S59), the control unit 36 proceeds to Step S61 in order to turn ON the transmission power of all of the transmission bands on the uplink side.

The HeNB 2B that performs the uplink band control process, upon detecting signal interference on the uplink side, controls a band on the uplink side, and causes the neighboring HeNB 2A to recognize that the HeNB 2B side controls the band. Therefore, the neighboring HeNB 2A is also able to avoid the signal interference on the uplink side between the neighboring HeNBs 2 by controlling the band on the uplink side.

Upon continuously detecting the signal interference on the uplink side after controlling the band on the uplink side, the HeNB 2B controls the band on the downlink side in cooperation with the control of the band on the uplink side, in order to enable the neighboring HeNB 2A side to easily recognize that the HeNB 2B side controls the bands. Further, the neighboring HeNB 2A is also able to avoid the signal interference on the uplink side between the neighboring HeNBs 2 by controlling the band on the uplink side and controlling the band on the downlink side in a cooperative manner.

FIGS. 7A to 7F are explanatory diagrams illustrating operation performed by each of the HeNBs 2 in relation to the uplink band control process. The HeNB 2B illustrated in FIG. 7A acquires a result of measuring an SIR, detects degradation of the SIR of a currently-used transmission band on the uplink side on the basis of the SIR, and detects signal interference on the uplink side on the basis of a result of the detection. In contrast, the HeNB 2A acquires a result of measuring an SIR, and because the SIR of a currently-used transmission band on the uplink side is at a high level, recognizes a state in which signal interference on the uplink side is less likely to occur on the basis of the SIR.

Figure 7A:
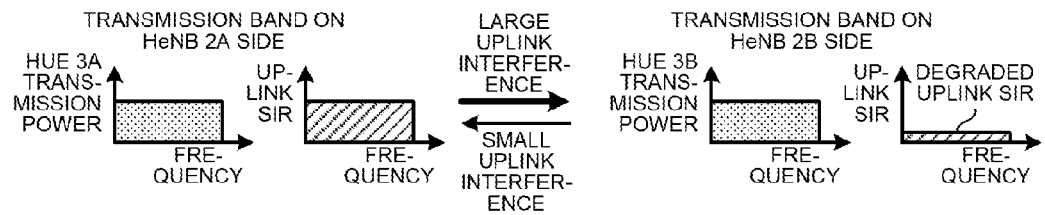
FIGS. 7A to 7F are diagrams for explaining operation performed by each of the HeNBs in relation to the uplink band control process.
Figure 7B:
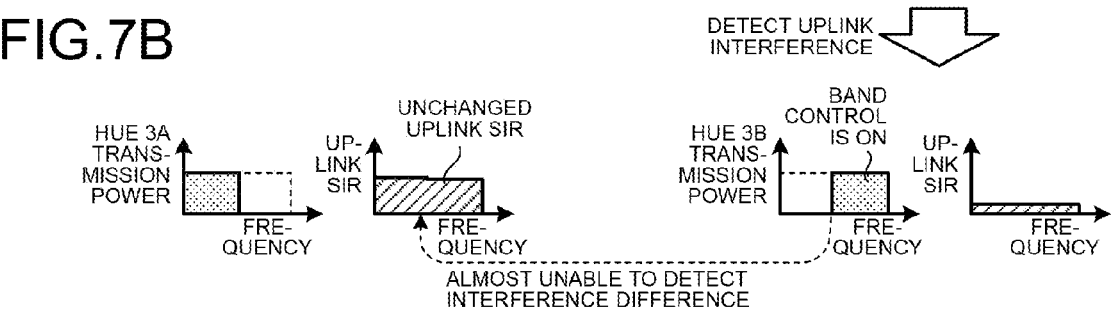

The HeNB 2B, upon detecting the signal interference on the uplink side, as illustrated in FIG. 7B, divides the currently-used transmission band into a high band and a low band, and controls the band on the uplink side to turn OFF the transmission power of the transmission band on the low band side and turn ON the transmission power of the transmission band on the high band side. However, because an interference difference between the SIR of the transmission band on the low band side and the SIR of the transmission band on the high band side in the currently-used transmission band is minute, the HeNB 2A is unable to recognize that the neighboring HeNB 2B side has divided the transmission band, that is, the neighboring HeNB 2B side has controlled the band on the uplink side.

Figure 7C:
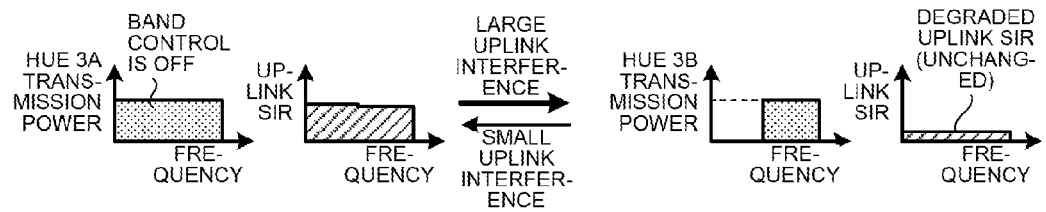
Figure 7D:
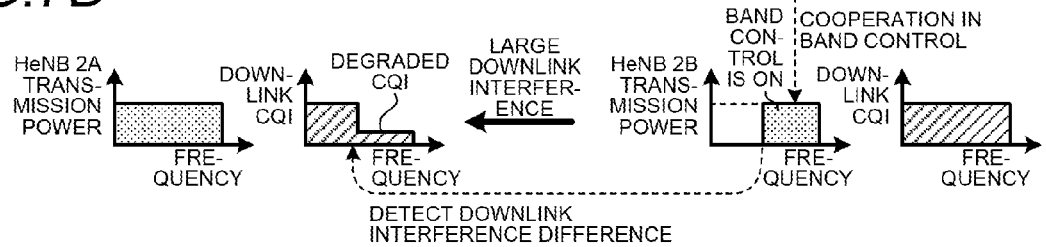

As illustrated in FIG. 7C, the HeNB 2B continuously detects the signal interference on the uplink side after controlling the band on the uplink side. Upon continuously detecting the signal interference on the uplink side, as illustrated in FIG. 7D, the HeNB 2B controls the band on the downlink side in cooperation with the band control on the uplink side. The HeNB 2B divides the transmission band on the downlink side into a high band and a low band, and controls the band on the downlink side to turn OFF the transmission power of the transmission band on the low band side and turn ON the transmission power of the transmission band on the high band side.

Figure 7E:
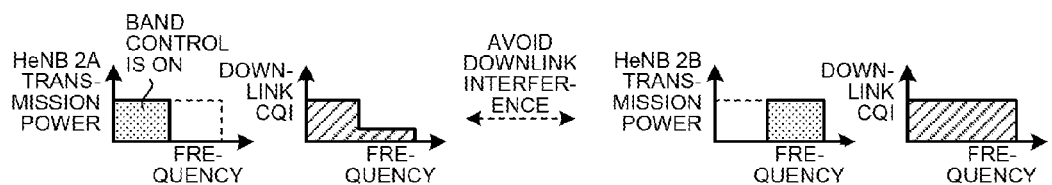

As illustrated in FIG. 7D, the HeNB 2A detects, as an interference difference, a large difference between a CQI of the transmission band on the low band side and a CQI of the transmission band on the high band side in a currently-used transmission band on the downlink side. The HeNB 2A, upon detecting the interference difference in the CQI, recognizes that the neighboring HeNB 2B side has controlled the band on the downlink side. Then, upon recognizing that the neighboring HeNB 2B side has controlled the band on the downlink side, the HeNB 2A controls the currently-used band on the downlink side as illustrated in FIG. 7E. The HeNB 2A divides the transmission band on the downlink side. The HeNB 2A controls the band on the downlink side to turn OFF the transmission power of the transmission band on the high band side in which the CQI is degraded and turn ON the transmission power of the transmission band on the low band side in which the CQI is at a high level in the currently-used transmission band on the downlink side.

Figure 7F:
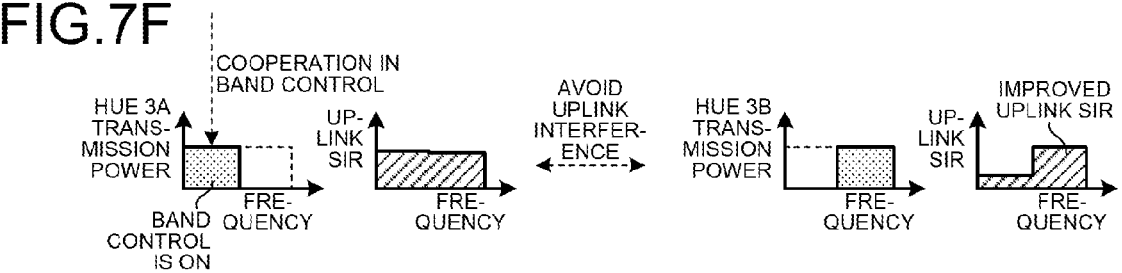

Further, the HeNB 2A controls the band on the uplink side as illustrated in FIG. 7F. The HeNB 2A divides the transmission band on the uplink side, turns OFF the transmission power of the transmission band on the high band side, and turns ON the transmission power of the transmission band on the low band side in the transmission band on the uplink side, in cooperation with the control of the transmission band on the downlink side. Consequently, the HeNB 2B recognizes that the neighboring HeNB 2A side has controlled the band on the uplink side, on the basis of an interference difference between the SIR on the high band side and the SIR on the low band side on the uplink side. Accordingly, the HeNB 2B is able to avoid signal interference on the uplink side in a state in which the transmission power of the transmission band on the low band side is turned OFF and the transmission power of the transmission band on the high band side is turned ON on the uplink side.

Namely, the HeNB 2B turns OFF the transmission power of the transmission band on the low band side for the uplink and the downlink, and turns ON the transmission power of the transmission band on the high band side for the uplink and the downlink. The HeNB 2A turns OFF the transmission power of the transmission band on the high band side for the uplink and the downlink, and turns ON the transmission power of the transmission band on the low band side for the uplink and the downlink. Therefore, the uplink and downlink transmission bands used by the neighboring HeNBs 2 do not overlap each other, so that it becomes possible to avoid not only signal interference on the uplink side but also signal interference on the downlink side.

Incidentally, when controlling the band on the uplink side, the HeNB 2A of the above described first embodiment divides the transmission band on the uplink side into a high band and a low band, turns OFF the transmission power of the transmission band on the high band side, and turns ON the transmission power of the transmission band on the low band side. However, the disclosed technology is not limited to this example, and it may be possible to turn OFF the transmission power of the transmission band on the low band side and turn ON the transmission power of the transmission band on the high band side after dividing the transmission band.

Further, when controlling the band on the downlink side, the HeNB 2A of the above described first embodiment divides the transmission band on the downlink side into a high band and a low band, turns OFF the transmission power of the transmission band on the high band side, and turns ON the transmission power of the transmission band on the low band side. However, the disclosed technology is not limited to this example, and it may be possible to turn OFF the transmission power of the transmission band on the low band side and turn ON the transmission power of the transmission band on the high band side after dividing the transmission band.

Incidentally, the HeNB 2A illustrated in FIG. 5(D) divides the transmission band on the uplink side, turns OFF the transmission power of the transmission band on the high band side, and turns ON the transmission power of the transmission band on the low band side. However, it may be possible to adjust the amount of transmission power or a bandwidth, in addition to turning ON the transmission power of the transmission band on the low band side on the uplink side. Consequently, it becomes possible to cause the HeNB 2B side to easily recognize an interference difference in the SIR. Therefore, an embodiment for adjusting the amount of the transmission power or the bandwidth of a transmission pattern will be described below as a second embodiment.

[b] Second Embodiment

Figure 8:
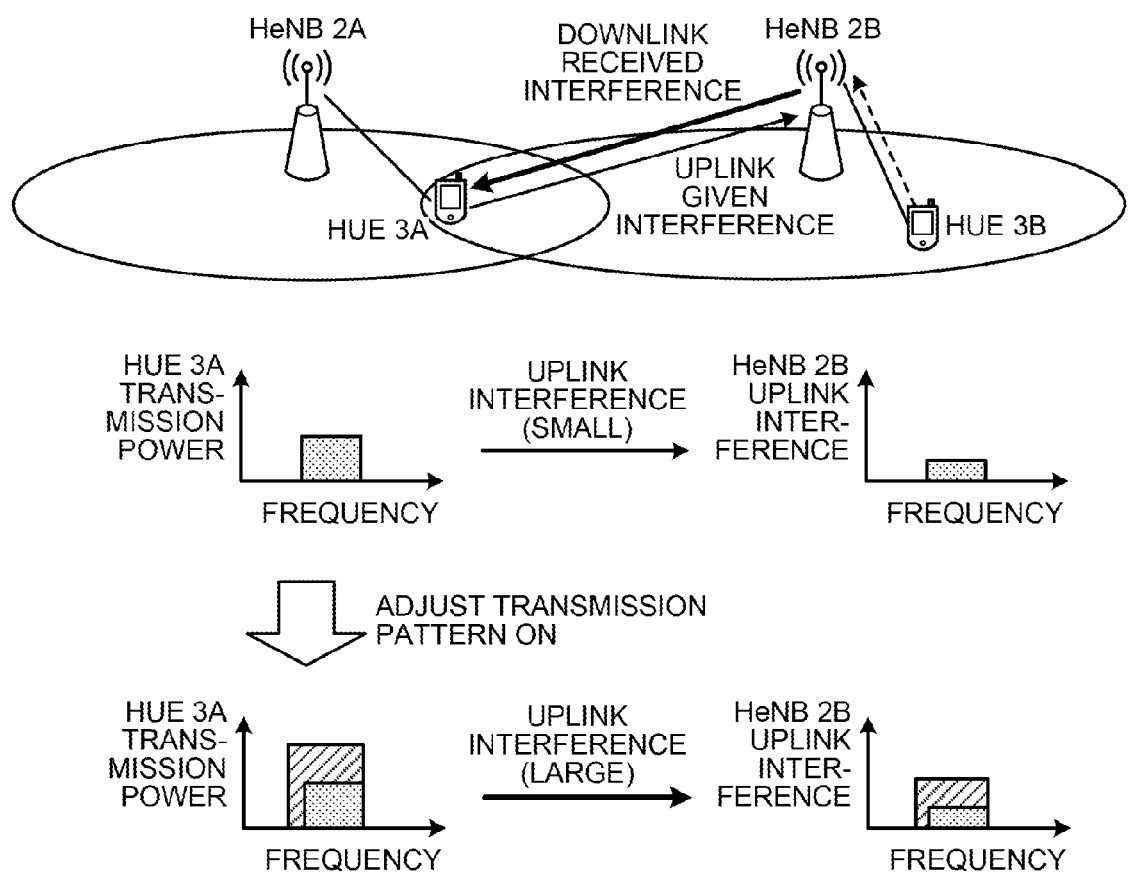
FIG. 8 is an explanatory diagram illustrating an example of a method of determining a transmission pattern according to a second embodiment.

FIG. 8 is an explanatory diagram illustrating an example of a method of determining a transmission pattern according to the second embodiment. For convenience of explanation, the same configurations as those of the femto wireless system 1 of the first embodiment will be denoted by the same symbols, and explanation of the same configurations and operation will be omitted.

In a method of determining an uplink transmission pattern implemented by the control unit 36, a target amount of interference to be applied to the HeNB 2 is taken into account in order to enable the HeNB 2B to recognize that the HeNB 2A side has controlled a band on the uplink side from an uplink giving interference caused by uplink transmission by the HUE 3A. For example, the amount of uplink transmission power of the HUE 3A is determined by an expression such that MIN (the maximum amount of electric power of the HUE, the amount of uplink transmission power on the HUE 3A side)≥(the target amount of uplink interference given to the HeNB 2B)+(the amount of path loss between the HeNB 2B and the HUE 3A).

Incidentally, the target amount of uplink interference is estimated by using an operation parameter, which is designated by a higher-level network device or the like and which is common to the HeNBs 2, or by using an acceptable value of the amount of uplink interference that is acceptable by each of the HeNBs 2 in the uplink communication with the HUE 3, for example. Further, when the condition of the above described expression is not satisfied only by increasing the amount of the transmission power of the HUE 3A, it may be possible to increase the bandwidth of the uplink transmission band of the HUE 3A depending on the deficiency in the amount of interference, as a way of adjustment.

By causing the HeNB 2A side to adjust the transmission pattern when controlling a band, it is possible to enable the HeNB 2B side to easily recognize an interference difference in the transmission pattern in the transmission band on the uplink side. Consequently, the HeNB 2B is able to easily recognize that the HeNB 2A side has controlled the band.

In the downlink band control process illustrated in FIG. 4, when the band on the uplink side is being controlled at Step S15 or when cooperation with the band control on the uplink side is not possible at Step S16, it may be possible to adjust the transmission pattern again by using the method of determining a transmission pattern according to the second embodiment.

In the uplink band control process illustrated in FIG. 6, when the band on the downlink side is being controlled at Step S55 or when cooperation with the band control on the downlink side is not possible at Step S56, it may be possible to adjust the transmission pattern again by using the method of determining a transmission pattern according to the second embodiment.

In the above described first embodiment, as described above, it is determined whether the transmission pattern on the uplink side is present as a method of determining whether cooperation in the band control for the uplink and the downlink is possible, and when the transmission pattern is absent, it is determined that the cooperation in the band control for the uplink and the downlink is impossible. However, even when the transmission pattern is absent, it may be possible to use a dummy signal as a substitute for the transmission pattern; therefore, an embodiment of this case will be described below as a third embodiment.

[c] Third Embodiment

Figure 9:
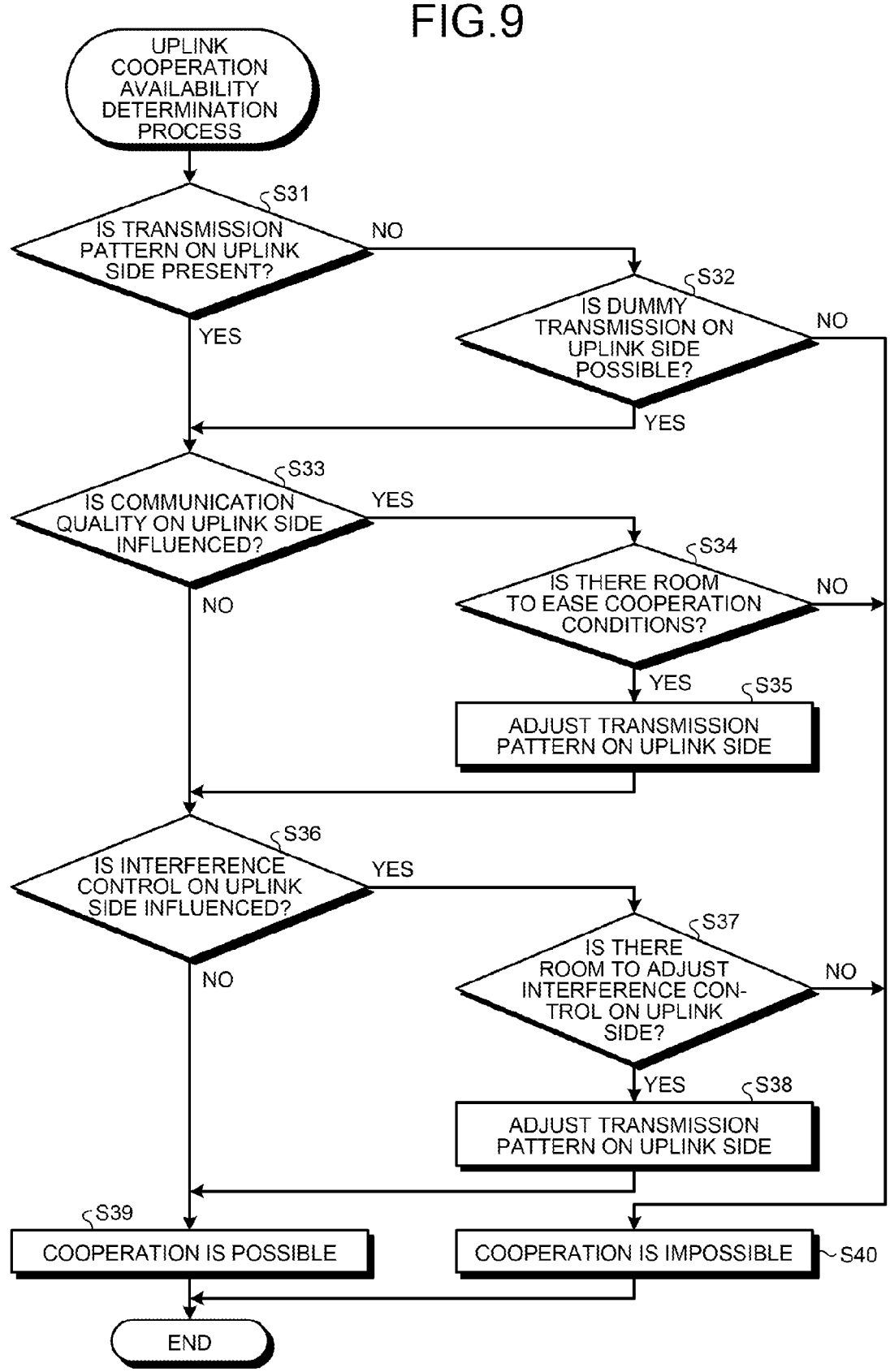
FIG. 9 is a flowchart illustrating an example of processing operation performed by a cooperation determining unit in the HeNB in relation to an uplink cooperation availability determination process.
Figure 10:
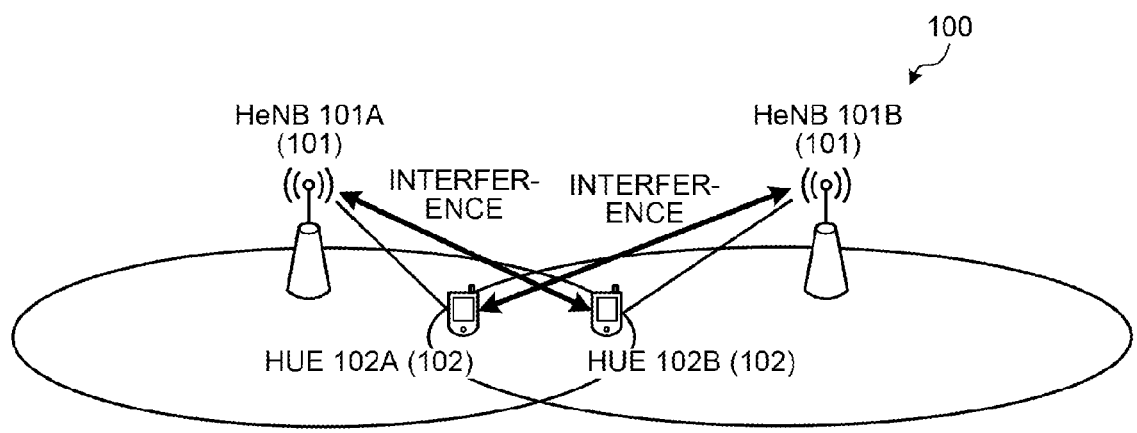
FIG. 10 is an explanatory diagram illustrating an example of a situation in which signal interference occurs between neighboring HeNBs.
Figure 11A:
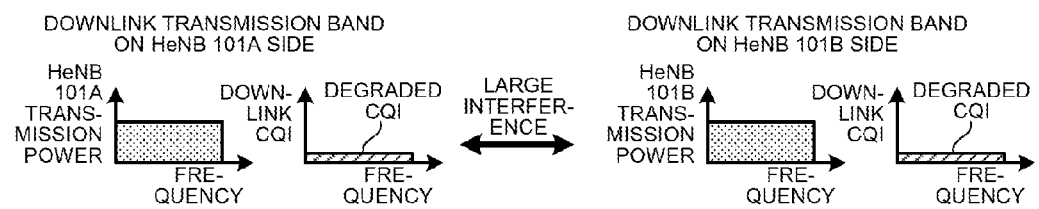
FIGS. 11A to 11C are explanatory diagrams illustrating an example of processing operation performed by each of the HeNBs in relation to a band control process.
Figure 11B:
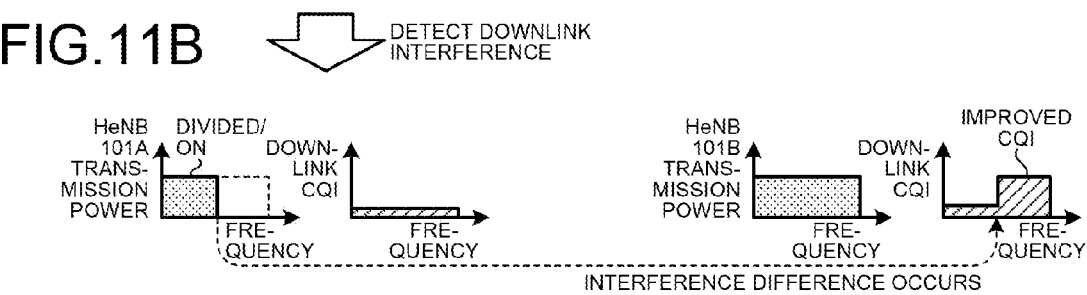
Figure 11C:
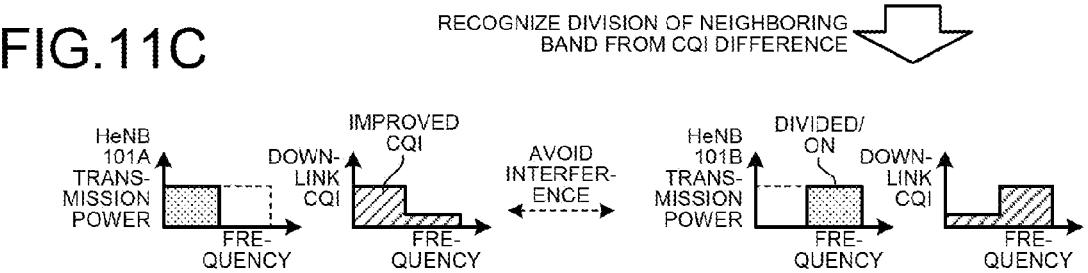
Figure 12:
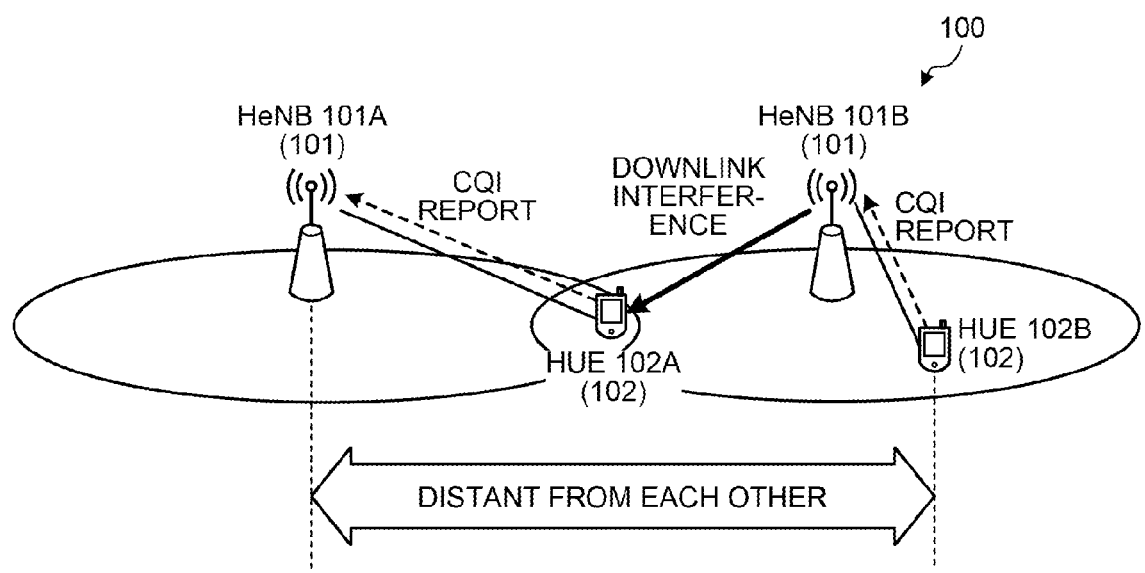
FIG. 12 is an explanatory diagram illustrating an example of a situation in which a HUE is subjected to signal interference on the downlink side by a neighboring HeNB.
Figure 13A:
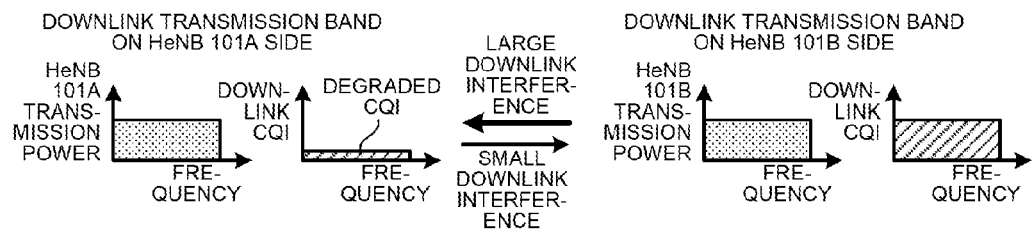
FIGS. 13A to 13C are explanatory diagram illustrating an example of operation performed by each of the HeNBs for controlling a downlink band in the situation illustrated in FIG. 12.
Figure 13B:
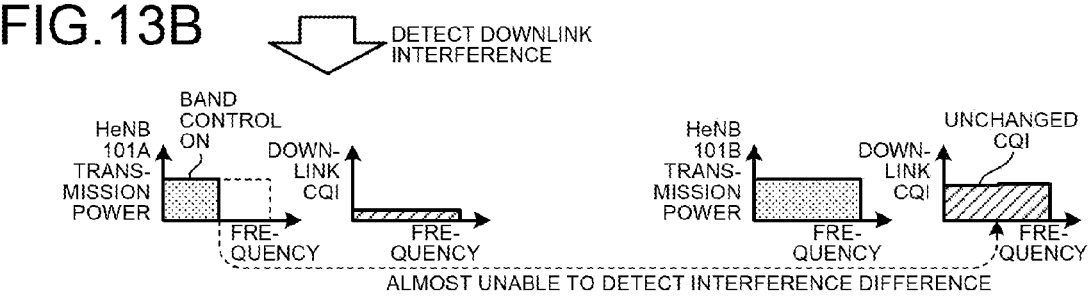
Figure 13C:
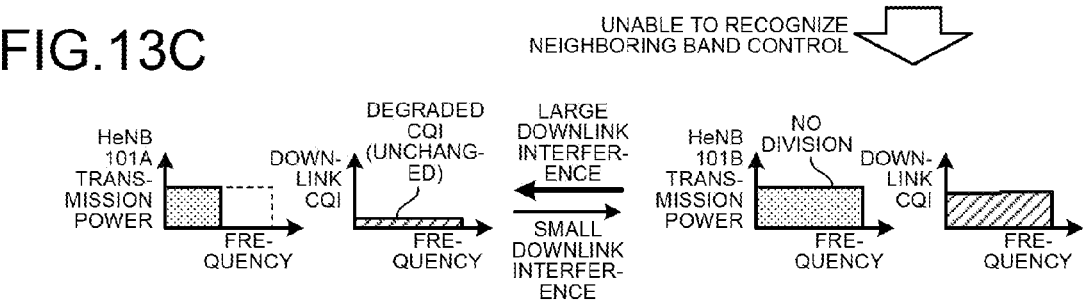
Figure 14:
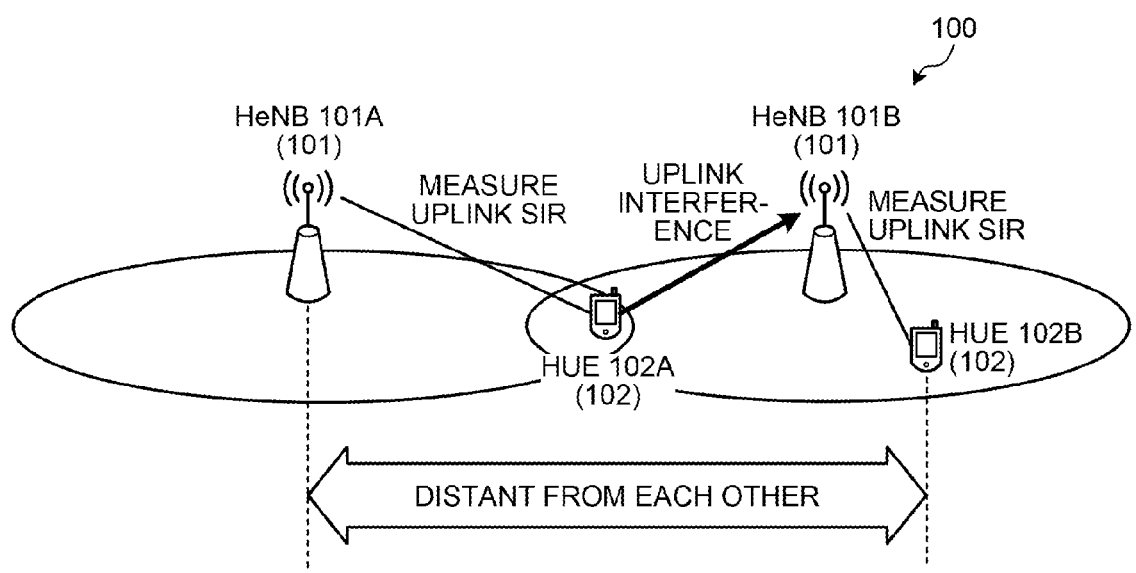
FIG. 14 is an explanatory diagram illustrating an example of a situation in which a neighboring HeNB is subjected to a signal interference on the uplink side from a different HUE.
Figure 15A:
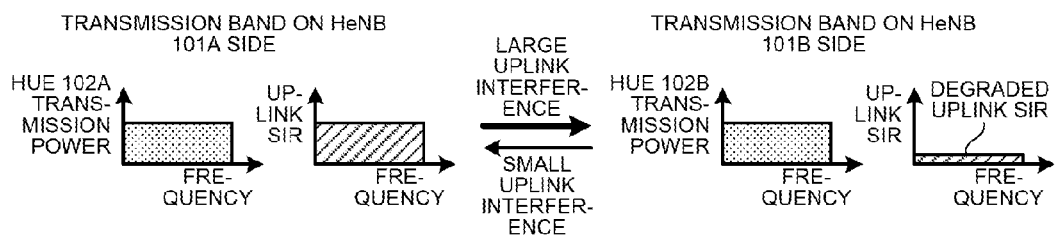
FIGS. 15A to 15C are explanatory diagrams illustrating an example of operation performed by each of the HeNBs for controlling an uplink band in the situation illustrated in FIG. 14.
Figure 15B:
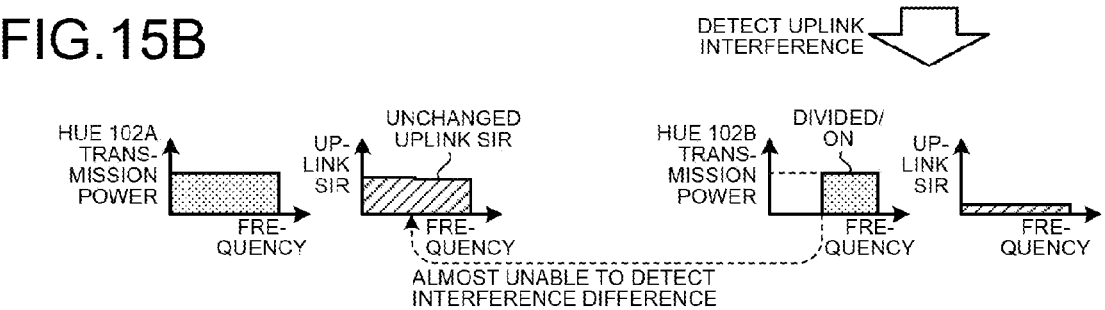
Figure 15C:
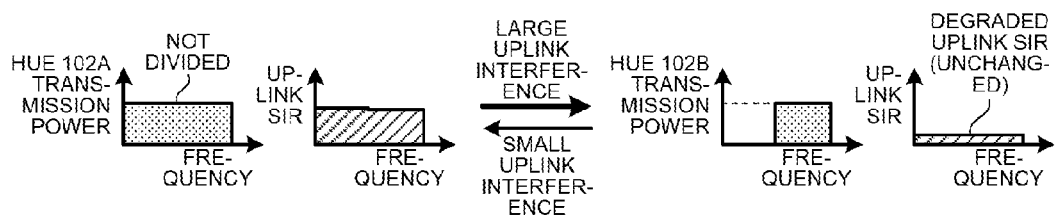

FIG. 9 is a flowchart illustrating an example of processing operation performed by the cooperation determining unit 35 in the HeNB 2 in relation to an uplink cooperation availability determination process. The uplink cooperation availability determination process illustrated in FIG. 9 is a process of determining whether cooperation with band control on the uplink side is possible when performing the band control process on the downlink side.

In FIG. 9, the cooperation determining unit 35 determines whether a transmission pattern on the uplink side is present (Step S31). When the transmission pattern on the uplink side is not present, (NO at Step S31), the cooperation determining unit 35 determines whether it is possible to transmit a dummy signal on the uplink side as a substitute for the transmission pattern (Step S32). Specifically, the process at Step S32 is a process of determining whether a free resource for the transmission pattern is present when the band on the uplink side is to be controlled.

When it is possible to transmit a dummy signal on the uplink side as a substitute for the transmission pattern (YES at Step S32), the cooperation determining unit 35 determines whether the communication quality on the uplink side is influenced (Step S33). Specifically, the process at Step S33 is a process of checking whether the communication quality on the uplink side meets a target quality when band control on the uplink side is performed in cooperation with band control on the downlink side. When the communication quality on the uplink side is influenced (YES at Step S33), the cooperation determining unit 35 determines whether there is room to ease cooperation conditions (Step S34). Specifically, the room to ease the cooperation conditions is room for the transmission pattern to be adjusted within the range in which the communication quality meets the target quality. When there is the room to ease the cooperation conditions (YES at Step S34), the control unit 36 adjusts the transmission pattern on the uplink side (Step S35). Meanwhile, adjustment of the transmission pattern includes a process of increasing the transmission power or adjusting the bandwidth of the transmission band on the uplink side within the range in which the communication quality on the uplink side meets the target quality. Further, adjustment of the transmission pattern may include adjustment to reduce the influence caused by the cooperation by limiting the period of the cooperation with the band control on the uplink side.

Then, the cooperation determining unit 35 determines whether interference control on the uplink side is influenced (Step S36). Meanwhile, when the band control on the uplink side is performed in cooperation with the band control on the downlink side, in some cases, signal interference on the uplink side may occur between the neighboring HeNBs 2 even on the uplink side. Specifically, the influence on the interference control is an influence on the interference control on the uplink side that may occur when there is no transmission band on the downlink side corresponding to the transmission band on the uplink side to avoid the signal interference on the uplink side.

When the interference control on the uplink side is influenced (YES at Step S36), the cooperation determining unit 35 determines whether there is room to adjust the interference control on the uplink side (Step S37). Specifically, the room to adjust the interference control is room to reduce the priority of the interference control on the uplink side. When there is the room to adjust the interference control on the uplink side (YES at Step S37), the cooperation determining unit 35 adjusts the transmission pattern on the uplink side (Step S38), determines that the cooperation in the band control for the uplink and the downlink is possible (Step S39), and terminates the processing operation illustrated in FIG. 9.

When it is determined that it is impossible to transmit a dummy signal on the uplink side as a substitute for the transmission pattern (NO at Step S32), the cooperation determining unit 35 determines that the cooperation in the band control for the uplink and the downlink is impossible (Step S40), and terminates the processing operation illustrated in FIG. 9.

When there is no room to ease the cooperation conditions (NO at Step S34), or when there is no room to adjust the interference control on the uplink side (NO at Step S37), the cooperation determining unit 35 proceeds to Step S40 in order to determine that the cooperation in the band control for the uplink and the downlink is impossible.

When the transmission pattern on the uplink side is present (YES at Step S31), the cooperation determining unit 35 proceeds to Step S33 in order to determine whether the communication quality on the uplink side is influenced. When the communication quality on the uplink side is not influenced (NO at Step S33), the cooperation determining unit 35 proceeds to Step S36 in order to determine whether interference control on the uplink side is influenced.

When the interference control on the uplink side is not influenced (NO at Step S36), the cooperation determining unit 35 proceeds to Step S39 in order to determine whether the cooperation in the band control for the uplink and the downlink is possible.

Even when a transmission pattern on the uplink side is present while a band on the downlink side is being controlled, when the communication quality on the uplink side is not influenced and when the interference control on the uplink side is not influenced, the cooperation determining unit 35 that performs the uplink cooperation availability determination process illustrated in FIG. 9 determines that the cooperation in the band control is possible. Further, it is possible to realize the cooperation in the band control while ensuring the communication quality.

Even when a transmission pattern on the uplink side is absent, when there is a dummy signal, when the communication quality on the uplink side is not influenced, and when the interference control on the uplink side is not influenced, the cooperation determining unit 35 determines that the cooperation in the band control is possible while ensuring the communication quality.

Even when the communication quality on the uplink side is influenced, when there is room to ease the cooperation conditions, and when the interference control on the uplink side is not influenced through adjusting the transmission pattern on the uplink side, the cooperation determining unit 35 determines that the cooperation in the band control is possible while ensuring the communication quality.

Even when the interference control on the uplink side is influenced, when there is room to adjust the interference control on the uplink side, the cooperation determining unit 35 determines that the cooperation in the band control is possible while ensuring the communication quality by adjusting the transmission pattern on the uplink side.

When there is no dummy signal on the uplink side, when there is no room to ease the cooperation conditions, or when there is no room to adjust the interference control on the uplink side, the cooperation determining unit 35 determines that the cooperation in the band control is impossible.

Incidentally, the uplink cooperation availability determination process illustrated in FIG. 9 is a process used for determining whether it is possible to control a band on the uplink side in a cooperative manner while a band on the downlink side is being controlled. However, it may be possible to perform the uplink cooperation availability determination process as a process used for determining whether it is possible to control a band on the downlink side in a cooperative manner while a band on the uplink side is being controlled. In this case, it is possible to determine whether cooperation with the band control on the downlink side is possible by performing the process by replacing "uplink" in each process in the uplink cooperation availability determination process in FIG. 9 with "downlink".

In the above described third embodiment, when it is determined that cooperation with band control on the uplink side is possible while a band on the downlink side is being controlled, a band on the uplink side is controlled. However, when it is determined that the cooperation is possible, it is not necessary to reduce a bandwidth, into which the transmission band on the uplink side is to be divided, down to the same bandwidth obtained in the band control on the downlink side. It may be possible to permit the cooperation after performing adjustment to allow flexibility for the bandwidth needed for the band control.

In the third embodiment, even when the HeNB 2A controls a band on one link side and the neighboring HeNB 2B side is unable to recognize that the HeNB 2A side controls the band, the HeNB 2A controls a band on the other link side in cooperation with the control of the band on the one link side. Then, the HeNB 2B recognizes that the HeNB 2A side has controlled the bands from an interference difference in the transmission band on the other link side, and controls the band on the one link side. Consequently, both of the HeNBs 2 avoid signal interference related to the transmission bands on the one link side by mutually controlling the bands, and also improve the throughput of the wirelessly-connected HUE 3.

Incidentally, in the above described embodiments, the HeNBs 2 that do not include means for notifying the neighboring HeNBs 2 of the transmission bands to be used for the uplink and the downlink are described by way of example; however, the disclosed technology is not limited to the HeNBs 2 but may be applied to communication apparatuses that do not include a means for notifying each other of transmission bands to be used for the uplink and the downlink.

Further, in the above described embodiments, uplink and downlink wireless systems employing an FDD method are described by way of example; however, the disclosed technology may be applied to wireless systems employing a Time Division Duplex (TDD) method.

In the above described embodiments, for example, when the downlink band control process is to be performed, a band on the downlink side is first controlled and thereafter a band on the uplink side is controlled in a cooperative manner; however, it may be possible to first control the band on the uplink side and thereafter control the band on the downlink side. Further, when the uplink band control process is to be performed, a band on the uplink side is first controlled and thereafter a band on the downlink side is controlled in a cooperative manner; however, it may be possible to first control the band on the downlink side and thereafter control the band on the uplink side.

The various processing functions implemented by the HeNB 2 of the above described embodiments are implemented by causing the signal processing unit 13 in the HeNB 2 to execute programs stored in various memories, such as nonvolatile storage media; however, it may be possible to cause the CPU 16 to execute the programs.

Further, the HeNB 2 of the embodiments is described as an integrated device with a wireless function and a control function; however, the disclosed technology is not limited to this example. It may be possible to configure the HeNB such that a wireless device and a control device are separated. In this case, the wireless device includes the antenna 11 and the RF unit 12 inside thereof, and the control device includes the signal processing unit 13, the external signal I/F 14, the memory 15, and the CPU 16 inside thereof.

The components of each of the units illustrated in the drawings need not necessarily be physically configured in the manner illustrated in the drawings. In other words, specific forms of distribution and integration of each of the units are not limited to those illustrated in the drawings, and all or part of the units may be functionally or physically distributed or integrated in arbitrary units depending on various loads or use conditions.

Further, various processing functions implemented by each apparatus are realized as described below. Specifically, all or an arbitrary part of the processing functions may be realized by a microprocessor, such as a CPU (or a Micro Processing Unit (MPU). Further, all or an arbitrary part of the processing functions may be realized by a program analyzed and executed by the CPU, or may be realized by hardware using wired logic.

According to an embodiment, it is possible to avoid uplink/downlink signal interference between neighboring base stations.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station device comprising a processor configured to:
   measure a communication quality of a transmission band on each of an uplink side and a downlink side;
   control, upon detecting a difference between the measured communication quality of the transmission band on each of the uplink side and the downlink side a band allocation for allocating a band portion to a communication band on the uplink side or the downlink side, the band portion having the communication quality on one of the uplink side and the downlink side satisfying a predetermined condition in the transmission band in which the difference is detected;
   control, upon detecting signal interference in one of the uplink side and the downlink side on the basis of the result of the measured communication quality, the band allocation for allocating the band portion in the transmission band to the communication band on the current link side of the uplink side and the downlink side in which the signal interference is detected; and
   control the band allocation for allocating the band portion in the transmission band to the communication band on the opposite link side of the uplink side and the downlink side controlled in cooperation with the control of the band allocation in the transmission band on the current link side of the uplink side and the downlink side.

2. The base station device according to claim 1, wherein the processor is further configured to:
   adjust one of a bandwidth and an amount of transmission power in the transmission band on the current link side of the uplink side and the downlink side; and
   allocate the band portion in the transmission band to the communication band on the current link side of the uplink side and the downlink side.

3. The base station device according to claim 1, wherein the processor is further configured to:
   adjust one of a bandwidth and an amount of transmission power in the transmission band on the opposite link side of the uplink side and the downlink side within a range in which the communication quality of the transmission band on the opposite link side of the uplink side and the downlink side satisfies the predetermined condition; and
   allocate the band portion in the transmission band to the communication band on the opposite link side of the uplink side and the downlink side.

4. A band control method of controlling allocation of transmission bands on an uplink side and a downlink side in order to avoid uplink signal interference and downlink signal interference between a first base station device and a second base station device that are located close to each other, the band control method comprising:
   measuring, by the first base station device, a communication quality of the transmission band on each of the uplink side and the downlink side;
   controlling, by the first base station device, upon detecting signal interference in one of the uplink side and the downlink side on the basis of the measured communication quality, a band allocation for allocating a band portion in the transmission band to the communication band on the current link side of the uplink side and the downlink side in which the signal interference is detected;
   controlling, by the first base station device, the band allocation for allocating the band portion in the transmission band to the communication band on the opposite link side of the uplink side and the downlink side controlled in cooperation with the control of the band allocation in the transmission band on the current link side of the uplink side and the downlink side;
   measuring, by the second base station device, the communication quality of the transmission band on each of the uplink side and the downlink side; and
   controlling, by the second base station device, upon detecting a difference between the communication quality of the transmission band on the opposite link side of the uplink side and the downlink side on the basis of the measured communication quality, the band allocation for allocating the band portion to the communication band, the band portion having the communication quality on one of the uplink side and the downlink side satisfying a predetermined condition in the transmission band in which the difference is detected.

* * * * *